United States Patent [19]

Yamamoto et al.

[11] 4,352,850
[45] Oct. 5, 1982

[54] FIVE-LAYERED PACKAGING FILM

[75] Inventors: Masataka Yamamoto; Tsutomu Uehara; Minoru Yoshimori, all of Iwaki, Japan

[73] Assignee: Kureha Kagaku Kogyo Kabushiki Kaisha, Tokyo, Japan

[21] Appl. No.: 240,792

[22] Filed: Mar. 5, 1981

[30] Foreign Application Priority Data

Mar. 19, 1980 [JP] Japan .............................. 55-36077[U]

[51] Int. Cl.$^3$ ............................................... B32B 7/02
[52] U.S. Cl. .................................... 428/214; 428/216; 428/515; 428/516; 428/483; 428/520; 428/349; 426/127
[58] Field of Search ............... 428/213, 349, 515, 516, 428/483, 520, 337, 354, 216, 214

[56] References Cited

U.S. PATENT DOCUMENTS

| 3,355,319 | 11/1967 | Rees | 428/349 |
| 3,595,740 | 7/1971 | Gerow | 428/349 |
| 4,082,877 | 4/1978 | Shadle | 428/35 |

FOREIGN PATENT DOCUMENTS

| 51-76366 | 1/1976 | Japan | 428/520 |
| 52-32911 | 8/1977 | Japan . | |
| 55-73339 | 5/1980 | Japan . | |

Primary Examiner—George F. Lesmes
Assistant Examiner—B. K. Johnson
Attorney, Agent, or Firm—Wegner & Bretschneider

[57] ABSTRACT

A five-layered packaging film comprises (a) an outer layer, (b) an adhesive layer, (c) a core layer, (b) an adhesive layer and (d) an inner layer in the order of lamination. The five-layered packaging film of the present invention is favorable in transparency, surface lustre, gas-barriering property. Further, the film has good thermoformability, heat-sealability and suitable shrinkability.

5 Claims, No Drawings

FIVE-LAYERED PACKAGING FILM

BACKGROUND AND DETAILED DESCRIPTION OF THE INVENTION

The present invention relates to a packaging film and particularly, relates to a five-layered packaging film favorable in transparency, surface lustre and gas-barriering property, and having good thermoformability, heat-sealability and suitable shrinkability.

One of packaging processes in which the film of the present invention is used will be briefly described as follows. The packaging film is heated at first to a temperature equal to or higher than the softening point of the film and moulded to have one or more depression(s) or recess(es) on its surface while using a mold kept at a lower temperature than the normal room temperature or in the vicinity of the normal room temperature by vacuum moulding or blow moulding. Then, after placing each article to be packaged in each depression of the packaging film, a base film or a cover film prepared separately is placed on the moulded packaging film containing articles to be packaged in its depressions, and the both films are heat-sealed while evacuating the space confined by the depression of the packaging film and the base film. The packaging process is different from "skin packaging" in which the articles themselves to be packaged are used as the mould, and is also different from a packaging process in which the packaging film is moulded by a heated mould and the moulded packaging film in a heated state is adhered to the articles to be packaged along with the outward form of the articles by a reduced or raised pressure. In the process of packaging used in the present invention, the form and shape of the packaging film after moulding is preliminarily decided by the form and shape of the mould, in other words, in the moulded packaging film there are depressions which are nearly equal in the size and the shape of the articles to be packaged. The three dimensions of the depression should be a little larger, respectively than the respective three dimensions of the articles to be packaged. That is, there is a clearance between the depression and the articles after placing the articles in the depressions for the purpose of facilitating the evacuation of the periphery of the articles when the sealing is carried out. However, the presence of such a clearance causes the generation of creases (or wrinkle) in a part of the packaging film, the part corresponding to the sides of the article packaged between the packaging film and the base film. There has been demanded to obtained nice-looking packaged articles without such creases in their side parts.

Hitherto, in order to obtain nice-looking packaged articles, the use of a film which adequately shrinks after finishing the packaging has been attempted. For instance, a three-layered film with a composition of an unstretched layer of polypropylen, an unstretched 6-nylon layer coated with polyvinylidene chloride and a layer of polyethylene, and a two-layered film with a composition of an unstretched 6-nylon layer coated with polyvinylidene chloride and a layer of a copolymer of ethylene and vinyl acetate have been attempted.

However, in the cases where such a composite film was used, there have been demerites of impairing the out-look of the products by making the cross section of the packaged ham due to squashing the corner parts of the ham by the too-large shrinking force of the composite film, and of generating creases in the corner parts of the upper side of the finished package due to the too large shrinkage of the sides although no crease generated in the sides.

On the other hand, in order to dissolve the demerits of conventional films for packaging, a less-shrinkable laminate film mainly comprising a resin layer which plastically deforms at its temperature of shaping has been attempted. However, although there is no generation of creases in the upper surface of the finished packaging by shrinkage, the creases once generated in the sides of the packaging scarcely disappear, and in addition, when the film is preliminarily heated for thermal-formation to make the depression(s), the film is elongated as a plastic deformation by only a small stress, and accordingly, creases are generated in the not-moulded flat peripheral parts of the packaging film, and the creases are fixed after cooling as the creases in the seal part between the packaging film and the base film. The presence of such creases in the seal part of the packaging film not only impair the out-look but also causes the remarkable reduction of preservability of the packaged products.

It is an object of the present invention to provide a five-layered packaging film comprising: (a) an outer layer, (b) an adhesive layer, (c) a core layer, (b) an adhesive layer and (d) an inner layer in the order of lamination;

(a) said outer layer being 10 to 40 microns in thickness and comprising a saponified copolymer of ethylene and vinyl acetate containing 25 to 75 mole % of ethylene units with a degree of saponification of higher than 90%, (b) said adhesive layer being 0.1 to 10 microns in thickness and comprising a graft copolymer containing (i) 95 to 99.99% by weight of a resin selected from the group consisting of a polymer of alpha-olefine, a copolymer of alpha-olefine and vinyl acetate and a saponified copolymer thereof, and (ii) 0.01 to 5% by weight of unsaturated carboxylic acid or its anhydrid units, (c) said core layer being 15 to 80 microns in thickness and comprising a polymer selected from the group consisting of (i) a copolymer of ethylene and vinyl acetate containing 85 to 95% by weight of ethylene units, (ii) a polyethylene and (iii) a polypropylene, and (d) said inner layer being 40 to 120 microns in thickness and comprising an ionomer containing a metalic content and a copolymer of alpha-olefine and acrylic acid or methacrylic acid; and the total thickness of said five-layered packaging film being 75 to 200 microns and the specific elasticity of said five-layered packaging film being 2 to 6 kg/cm of the width of said five-layered packaging film at an elongation of 2.5% and a temperature of 50° to 150° C.

Further object is to provide a process for preparing the five-layered packaging film.

Other objects and advantages of the present invention will become more apparent hereinafter.

The present inventors after studying various combinations of polymers and copolymers for attaining the purpose of the present invention, have found out that even without using a resin of particularly high elasticity, a favorable packaged product is available by using a five-layered film of a specific elasticity of 2 to 6 kg/cm, width at an elongation of 2.5% and at a temperature of 50° to 150° C. (corresponding to the temperature of preliminary shaping to give depressions in the film) including as its outer layer a film comprising a specific saponified copolymer of ethylene and vinyl acetate of favorable transparency and surface lustre, the five-layered film showing a favorable processability in thermoforming deep-drawn moulded depression(s) and an appropriate shrinkability, and have completed the present invention.

As for the outer layer, in the case where the content of ethylene units is less than 25 mole %, the efficiency of melt-extrusion of the resin is unfavorable because the melting point is too much close to the decomposition point, and on the other hand, in the case where the content is larger than 75 mole % or the degree of saponification is lower than 90%, the gas-barriering property is reduced as well as the reduction of the transparency and surface lustre of the film prepared from the copolymer.

As for the adhesive layer, in the case where the content of the unsaturated carboxylic acid and/or its anhydride is less than 0.01% by weight, the layer loses its adhesion, and on the other hand, in the case of larger than 5% by weight, it is difficult to produce a graft copolymer.

The core layer melts at the temperature of shaping (50° to 150° C.) and its elasticity is extremely low at such a temperature. The afore-mentioned copolymer containing 85 to 95% by weight of ethylene units shows a melting point not too low and gives a film of especially favorable transparency, such a film giving a dimensional stability to the five-layered film as its component layer after solidifying by cooling.

The ionomer of the inner layer is a resin containing metalic content and a copolymer of alpha-olefin and unsaturated aliphatic carboxylic acid, for instance, ethylene and acrylic acid or methacrylic acid, and the metal content is preferably a compound of sodium or zinc. Such a metal compound provides a favorable heat-sealability and transparency to the composite film, and since its ionic bonding becomes weaker at a higher temperature but becomes stronger at a low temperature, its plastic deformation at a high temperature is easy and its dimensional stability after solidifying by cooling is sufficient for the application in the five-layered film of the present invention.

The five-layered composite film of the present invention is prepared by the conventional method such as co-extrustion, lamination after respective extrusion of the component layers or combination of the two, particularly preferably by co-extrusion which is carried out by a series of simple steps.

The constitution of the thickness of each layer of the five-layered film of the present invention is preferably (a) 15 to 35 microns of the outer layer, (b) 0.1 to 10 microns of each of the adhesive layers, (c) 35 to 55 microns of the core layer and (d) 50 to 80 microns of the inner layer, and especially, the thickness of the adhesive layer is less than 5% of the total thickness of the five-layered film. Furthermore, the sum of the thickness of the outer layer and the core layer is 30 to 120 microns, preferably 50 to 90 microns, the ratio of the outer layer's thickness to the core layer's thickness is 1 to 2, and the total thickness of the five-layered film is preferably 100 to 180 microns.

In addition, the temperature of forming depressions in the five-layered film is preferably 50° to 150° C., more preferably 60° to 130° C., however, it should be noted that the more preferable range of temperature of forming depressions varies according to the kinds of resins in the core layer, for instance, the lower limit of forming depression is about 80° C. when the core layer is made of polyethylene, and about 110° C. when it is made of polypropylene.

Evaluation of the out-look of the packaged products with the five-layered film of the present invention was carried on the packaged products prepared by using a thermally shaped five-layered film with moulds having depressions of 9.7 cm in inner diameter and of 2 cm in depth and sliced pieces of ham of about 9.5 cm in diameter and about 1.8 cm in thickness as articles to be packaged.

The five-layered packaged film of the present invention when used to package soft foodstuffs such as sliced ham after subjected to preliminary deep-shaping to give deep depressions shows a good processability in deep shaping, a good sealability and a good gas-barrering property with favorable transparency and surface lustre resulting in good out-look with good finish, and the packaging film is extremely useful for packaging soft foodstuffs such as sliced ham.

The present invention will be more precisely explained by the following non-limitative examples:

EXAMPLE 1

The following four kinds of resins were respectively extruded by four extruders, and each extruded resin was treated by a circular die for co-extrusion in combination to be a tubular five-layered film. A five-layered film was prepared by inflating the tubular five-layered film. The resin for the first(outer) layer of the five-layered film was a saponified copolymer of ethylene and vinyl acetate containing 32 mole % of ethylene units with a degree of saponification of 98%; the resin for the second and forth(adhesive) layers was a graft copolymer obtained by grafting 1% by weight of maleic anhydride to a copolymer of ethylene and vinyl acetate containing 5% by weight of vinyl acetate units; the resin for the third(core) layer was a copolymer of ethylene and vinyl acetate containing 5% by weight of vinyl acetate units and the resin for the fifth(inner) layer was the resin containing sodium element and a copolymer of ethylene and methacrylic acid (SURLYN 1601: du Pont trade mark). After controlling the outputs of extruders, the thickness of the respective first, second, third, forth and fifth layers was made to be 30, 5, 40, 5 and 80 microns in the order.

The thus prepared five-layered film was applied to a vacuum packaging machine provided with a deep-shaping apparatus. In the machine, the film was brought into contact to a flat metallic plate heated at 100° C. with the film's inner layer and also into contact with the film's outer layer to a non-heated metallic mold having a plurality of depressions, arranged in three parallel lines, of 9.7 cm in inner diameter and of 2.0 cm in depth provided with an outlet connected to a suction pump, for 1.5 sec, while operating the suction pump. Thus, the heated film by the heated plate is moulded into a form corresponding to the mould. Then, sliced pieces of ham was placed in the depression of the film at a rate of six pieces of ham amounting to about 9.5 cm in diameter and to about 1.8 cm in height per depression. After placing a base film as a lid on the shaped film having slices of ham in its depressions, the pump was again operated to evacuate the space between the depressions and the lid and in the same time, the peripheral flat parts of the moulded film was sealed with the base film at a temperature of 120° C. for 1.0 sec by external heating. The base film used as the lid was composed of three layers, that is, a biaxially stretched polyester film of 12 microns in thickness coated with a membraneous film of a copolymer of vinylidene chloride of 2 microns in thickness and a film of the ionomer (the sodium salt of a copolymer of ethylene and methacrylic acid) of 40 microns in thickness arranged in the order. The base film was placed on the moulded film in order to both the layers of ionomer to come into contact.

COMPARATIVE EXAMPLE 1

The same foodstuff, sliced ham, was packaged in the same manner as in Example 1 except for using the packaging film shown below and the base film (for lid) also shown below at a temperature of the metallic plate for heating the packaging film of 110° C.

(i) The packaging film: composed of from the top, unstretched polypropylene layer/unstretched polyamide layer coated with a copolymer of vinylidene chloride/polyethylene layer, of thickness of 40/30/50 microns.

(ii) The base film: composed of polyethylene terephthalate layer coated with a copolymer of vinylidene chloride and polyethylene layer with respective thickness of 14 and 50 microns.

COMPARATIVE EXAMPLE 2

The same foodstuff, sliced ham, was packaged in the same manner as in Example 1 except for using the packaging film shown below and the base film also shown below at the temperature of 80° C. of the metallic flat plate for heating the packaging film.

(i) The packaging film: composed of from the top, a layer of ionomer, sodium salt of a copolymer of ethylene and methacrylic acid/a layer of a copolymer of vinylidene chloride/the sodium salt of the copolymer of ethylene and methacrylic acid (SURLYN 1601: du Pont trade mark), prepared by co-extrusion with respective thickness of 30/30/70 microns.

ASSEMBLED RESULTS OF EXAMPLE 1 AND COMPARATIVE EXAMPLES 1 AND 2

On each 30 packaged products produced by Example 1 and Comparative Examples 1 and 2, evaluation of the out-look was carried out concerning the presence and absence of creases on (i) the upper surface, (ii) the side surface and (iii) the seal part after keeping the packaged products at 5° C. for 3 days. The results of the evaluation are shown in Table 1.

TABLE 1

| Packaging film of | Base film | Appearance (out-look), Creases on | | |
|---|---|---|---|---|
| | | upper | side | seal part |
| Example 1 | A* + B** | none | none | none |
| Comparative Ex. 1 | A + C*** | present | none | none |
| Comparative Ex. 2 | A + B | none | none | present |

Note:
A* means a layer of polyethylene terephthalate coated with a copolymer of vinylidene chloride,
C*** means a layer of polyethylene and
B** means a layer of ionomer, sodium salt of a copolymer of ethylene and methacrylic acid.

SPECIFIC ELASTICITY OF THE PACKAGING FILMS

Secant modulus (kg/cm, width) of each packaging film in Example 1 and Comparative Examples 1 and 2 was measured at its elongation of 2.5% following ASTM-D-882, the specimen at the measurement being 25 cm in length and 1.0 cm in width and the rate of elongation being 2.5 mm/min at a temperature of the heated plate (in shaping) ±10° C.

TABLE 2

| Packaging film | Temperature (°C.) | Secant modulus at elongation of 2.5% (kg/cm, width) |
|---|---|---|
| Example 1 | 90 | 6.0 |
| | 100 | 4.8 |
| | 110 | 3.8 |
| Comparative Example 1 | 100 | 15.3 |
| | 110 | 11.1 |
| | 120 | 7.7 |
| Comparative Example 2 | 70 | 2.2 |
| | 80 | 1.5 |
| | 90 | 1.0 |

In consideration of Tables 1 and 2, when packaging film of the elastic specificity of larger than 6.0 kg/cm, width such as the film of Comparative Example 1, creases generated on the upper surface of the packaged products, and when the film of the elastic specificity of smaller than about 2.0 kg/cm, width such as the film of Comparative Example 2, creases generated at the seal part of the packaged product, however, when the packaging film according to Example 1 of the present invention was used, creases did not generate on the upper surface, the side part and the seal part.

Table 3 shows the other physical properties of the packaging films of Example 1 and Comparative Examples 1 and 2.

TABLE 3

| Property | Example 1 | Comp. Ex. 1 | Comp. Ex. 2 |
|---|---|---|---|
| Permeability* to oxygen at 30° C. 60% r.h. (cc/m$^2$.24.h.atm) | 10 | 70 | 30 |
| Surface luster at 23° C. (JIS* Z-8741, %) | 120 | 100 | 85 |
| Average light transmittance at 23° C. (JIS K-6714, %) | 90 | 80 | 85 |
| Tensile strength at 23° C., (ASTM D-882, kg/mm$^2$) | 2.7 | 3.0 | 2.0 |
| Elongation at break at 23° C. (ASTM D-882, kg/mm$^2$) | 400 | 600 | 400 |

Note:
*Measure by MOCON OX-TRAN (registered trade name) Model 100 made by Modern Controls Inc., USA.

In addition, the packaging film prepared in Example 1 was suitable for use in other properties than those described above.

EXAMPLE 2

In a method similar to that in Example 1, another five-layered film of the following constitution was prepared by coextrusion and inflation:

The outer layer of 20 microns in thickness made of a saponified copolymer of ethylene and vinyl acetate containing 45 mole % of ethylene units with a degree of saponification of 98%; the adhesive layer of 5 micron in thickness made of a grafted copolymer of ethylene and vinyl acetate containing 15% by weight of vinyl acetate units grafted with side chains of 1% by weight of maleic anhydride; the core layer of 50 microns in thickness made of a copolymer of propylene and ethylene containing 3.5% by weight of ethylene units and of melting point of 145° C. and the inner layer of 80 microns in thickness made of the same ionomer as in Example 1.

By using the thus prepared five-layered film, the same foodstuff, sliced ham, was packaged by a similar process to that in Example 1 except for the temperature of shaping of 110° C.

The specific elasticity of the five-layered film in this example at the temperature of 110° C. was 2.8 kg/cm, width at an elongation of 2.5%.

In the packaged products, no crease was found on their upper surface, the side part and the seal part with favorable out-look. The packaging film prepared in Example was also favorable in physical properties.

EXAMPLE 3

Still another five-layered film was prepared by a method similar to that of Example 1 while using the same resins as in Example 1 for the outer-, the adhesive- and the inner layers, however, using a low-density polyethylene of specific gravity of 0.915 for the core layer, and co-extruding the resins followed by inflation. The thickness constitution of this five-layered film was the same as in Example 1.

The thus obtained five-layered film was as little inferior to that of Example 1 in transparency, however, the difference between the two films was out of the practical question.

Sliced ham was packaged with the shaped five-layered film in a manner similar to that in Example 1 except for the temperature of the heated flat plate of 90° C.

The thus prepared packaged products had a favorable out-look without creases on the upper surface, the side and the seal part.

In addition, the specific elasticity at 90° C. and 2.5% elongation was 4.2 kg/cm, width.

What is claimed is:

1. A five-layered packaging film for packaging soft foodstuffs comprising:
    (a) an outer layer, (b) a first adhesive layer, (c) a core layer, (d) a second adhesive layer and (e) an inner layer in order of lamination;
    said outer layer being 15 to 35 microns in thickness and consisting essentially of a saponified copolymer of ethylene and vinyl acetate containing 25 to 75 mole % of ethylene units with a degree of saponification of higher than 90%,
    said first and second adhesive layers each being 0.1 to 10 microns in thickness and consisting essentially of a graft copolymer containing (i) 95 to 99.99% by weight of a resin selected from the group consisting of polymers of alpha-olefines, copolymers of alpha-olefines and vinyl acetate and saponified copolymers thereof, and (ii) 0.01 to 5% by weight of unsaturated carboxylic acid units or anhydride units thereof,
    said core layer being 35 to 55 microns in thickness and consisting essentially of a polymer selected from the group consisting of (i) copolymers of ethylene and vinyl acetate containing 85 to 95% by weight of ethylene units, (ii) polyethylenes and (iii) polypropylenes,
    said inner layer being 50 to 80 microns in thickness and consisting essentially of an ionomer containing sodium or zinc as a metallic component and a copolymer of an alpha-olefine and acrylic acid or methacrylic acid; and
    the total thickness of said five-layered packaging film being 100 to 180 microns and the specific elasticity of said five-layered packaging film being 2 to 6 kg/cm of the width of said five-layered packaging film at an elongation at 2.5% and a temperature of 50° to 150° C.

2. The film according to claim 1, wherein the outer layer and the core layer are 30 to 120 microns in the sum of thicknesses.

3. The film according to claim 1, wherein the sum of thicknesses is 50 to 90 microns.

4. The film according to claim 1 or 3, wherein the outer layer and the core layer have the ratio of the thickness of the outer layer to that of the core layer being from 1 to 2.

5. The film according to claim 1, wherein the thickness of the adhesive layer is less than 5% of the thickness of the five-layered packaging film.

* * * * *